United States Patent [19]

Volkhin et al.

[11] Patent Number: 4,656,736

[45] Date of Patent: Apr. 14, 1987

[54] APPARATUS FOR SEALING A CYLINDRICAL STORAGE CELL

[75] Inventors: Nikolai N. Volkhin; Vladimir P. Ardabatsky, both of Leningrad; Boris A. Dulya, Smolensk; Vitaly P. Zhuravlev, Smolensk; Alexandr V. Stepanov, Smolensk, all of U.S.S.R.

[73] Assignee: Vsesojuny Nauchno-Issledovatelsky Proektno-Konstruktorsky I Tekhnologichesky Akkumulyatorny Institut, Lenigrad, U.S.S.R.

[21] Appl. No.: 817,078

[22] Filed: Jan. 8, 1986

[51] Int. Cl.[4] .................. H01M 6/00; B23P 19/00
[52] U.S. Cl. ............................... 29/730; 29/731; 29/240; 29/623.2
[58] Field of Search .......... 29/730, 731, 508, 515, 29/516, 240, 623.2

[56] References Cited

U.S. PATENT DOCUMENTS

| | | | |
|---|---|---|---|
| 3,221,403 | 12/1965 | Simonton | 29/730 X |
| 3,226,813 | 1/1966 | Birkett | 29/240 |
| 3,457,629 | 7/1969 | Janacek | 29/515 |
| 4,136,443 | 1/1979 | Nabiullin et al. | 29/731 |
| 4,212,179 | 7/1980 | Juergens | 29/731 X |

FOREIGN PATENT DOCUMENTS 1128727  1/1957  France ........................... 29/515

*Primary Examiner*—Brian E. Hearn
*Assistant Examiner*—Stephen J. Kalafut
*Attorney, Agent, or Firm*—Lilling & Greenspan

[57] ABSTRACT

An apparatus for sealing a cylindrical storage cell comprises a main holder accommodating the storage cell, an auxiliary holder accommodating a rod, and a means for rolling-in the housing of the cylindrical storage cell including two shafts secured coaxially in the wall of the auxiliary holder. Mechanically linked with each such shaft are a seaming roller and an element for adjusting the distance between the seaming rollers interconnected therebetween, a stop means for limiting the movement of the seaming roller being in turn connected to the element for adjusting the distance between the rollers.

4 Claims, 3 Drawing Figures

APPARATUS FOR SEALING A CYLINDRICAL STORAGE CELL

BACKGROUND OF THE INVENTION

1. Field of the Invention

This invention relates to equipment associated with mechanized sealing cylindrical storage cells, and more particularly to an apparatus for sealing a cylindrical storage cell.

The invention can find application in the production of chemical power sources, predominantly cylindrical storage cells.

2. Description of Related Art

The ever increasing use of the chemical sources of electric energy imposes heavy demands on the production equipment, manufacturing efficiency, and reduction in the percentage of rejects, particularly during sealing cylindrical storage cells.

There is known an apparatus for sealing cylindrical storage cells (cf., U.S. Pat. No. 4,136,443, Cl. 29/731, 29/623.2, 53/336, 53/488, published 1979), which comprises a main holder to hold a cylindrical storage cell, an auxiliary holder capable of longitudinal travel accommodating an axially movable rod for orientating a cover cap of the cylindrical storage cell perpendicularly to the rod axis, and a means for seaming or rolling-in the housing of the cylindrical storage cell arranged in the auxiliary holder. Used in this apparatus as the roll-in means is at least one die with a tapered portion, the angle at the taper apex being $10 \pm 5°$.

However, a considerable force is required for the die to impart radial deformation to the housing of the cylindrical storage cell, whereby cracks tend to appear at the housing surface to result in a high percentage of rejects.

In addition, the above apparatus is disadvantageous in that in order to reduce the force required for seaming the housing of the cell, it is sealed by the die in several stages, which affects the production efficiency of the apparatus.

SUMMARY OF THE INVENTION

It is therefore an object of this invention to provide an apparatus for sealing cylindrical storage cells which would ensure reduced rate of rejects.

Another object is to provide an apparatus which would be more efficient.

These objects are attained by that in an apparatus for sealing a cylindrical storage cell comprising a main holder capable of rotation and accommodating a cylindrical storage cell, an auxiliary holder capable of longitudinal travel and accommodating a rod axially movable along its longitudinal axis to orientate a cover cap of the cylindrical storage cell perpendicularly to this axis, and a means for rolling-in the housing of the cylindrical storage cell arranged in the auxiliary holder, according to the invention, the means for rolling-in the housing of the cylindrical storage cell have two shafts secured axially in a wall of the auxiliary holder, two seaming rollers each of which is mounted on its respective shaft to rotate from the cylindrical storage cell and working surfaces of which face a portion of the housing of the cylindrical storage cell to be rolled-in, two elements for adjusting the distance between the seaming rollers mechanically linked with the shafts and with the seaming rollers, and two stop means for limiting the movement of the seaming rollers mechanically linked with the elements for adjusting the distance between the seaming rollers.

Preferably, the working surface of the seaming rollers of the means for rolling-in the housing of the cylindrical storage cell is comprised of three sections, particularly two toroidal sections, one of which conforms to the configuration of the portion of the housing of the cylindrical storage cell to be rolled-in, and an interconnecting straight section.

Advisably, the element for adjusting the distance between the seaming rollers of the means for rolling-in the housing of the dylindrical storage cell is fashioned as a sleeve mounted on the shaft and screwed into the wall of the auxiliary holder until it is brought into contact with the seaming roller.

Preferably, used as the stop means for limiting the movement of the seaming rollers in the proposed apparatus is a screw which is set perpendicularly to the longitudinal axis of the shaft in a respective end face of the auxiliary holder to a contact with the sleeve.

In view of the foregoing, the present invention makes it possible to reduce the forces of friction exerted on the housing of cylindrical storage cells, which brings down the amount of rejects during the sealing operation.

Also, the invention allows a reduction in the force required for rolling-in the housings of cylindrical storage cells and a reduction in rejects due to seal leaks.

In addition, the invention ensures a uniform force during rolling-in the housings of cylindrical storage cells to result in extended continuous operation of the apparatus.

BRIEF DESCRIPTION OF THE DRAWINGS

Other objects and advantages of the present invention will become more fully apparent from the description of a specific embodiment thereof taken in conjunction with the accompanying drawings: in which.

DESCRIPTION OF THE PREFERRED EMBODIMENT

Figure 1:
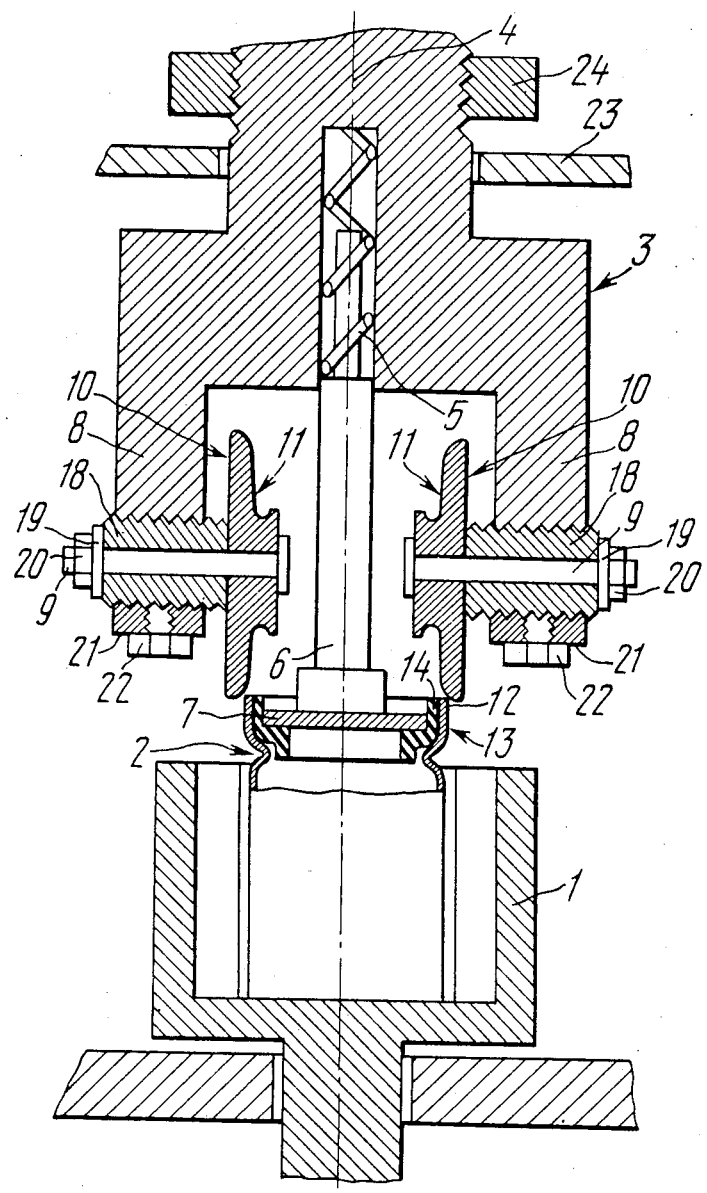
FIG. 1 is a longitudinal sectional view of an apparatus for sealing a cylindrical storage cell in accordance with the invention, shown at the initial stage of rolling-in of the housing of the storage cell.

An apparatus for sealing a cylindrical storage cell comprises a main holder 1 (FIGS. 1 and 2) capable of rotation and accommodating a cylindrical storage cell 2, and an auxiliary holder 3 capable of longitudinal travel. Secured in the holder 3 for movement along its longitudinal axis 4 by a spring 5 is a rod member 6 serving to orientate a cover cap 7 of the storage cell 2 perpendicularly to the axis 4. Two shafts 9 are coaxially secured in a wall 8 of the holder 3, each of these shafts 9 carrying a seaming roller 10 rotatable by the cylindrical storage cell 2. Working surfaces 11 of the rollers 10 face a portion 12 of the housing 13 of the storage cell 2 to be rolled-in jointly with a sealing gasket 14. The surfaces 11 of the rollers 10 include three sections, particularly two toroidal sections 15 and 16 (FIG. 3) and an interconnecting straight section 17.

The section 15 conforms in configuration to the configuration of the portion 12 (FIG. 2) of the housing 13. Provided on each shaft 9 is an element 18 (hereinafter referred to as sleeve 18) for adjusting the distance between the seaming rollers 10, this sleeve 18 being screwed into the wall 8 of the holder 3 until it is in contact with the roller 10. The shaft 9 also carries a washer 19 and a nut 20.

Screwed into each end face 21 of the wall 8 of the holder 3 is a stop means 22 (particularly, screw 22) for limiting the movement of the seaming rollers 10 perpendicularly to the longitudinal axis of the shaft 9 to a contact with the sleeve 18. Lock washer 23 and a bearing nut 24 are arranged in succession on the holder 3.

The apparatus for sealing a cylindrical storage cell operates in the following manner.

Figures 2, 3:
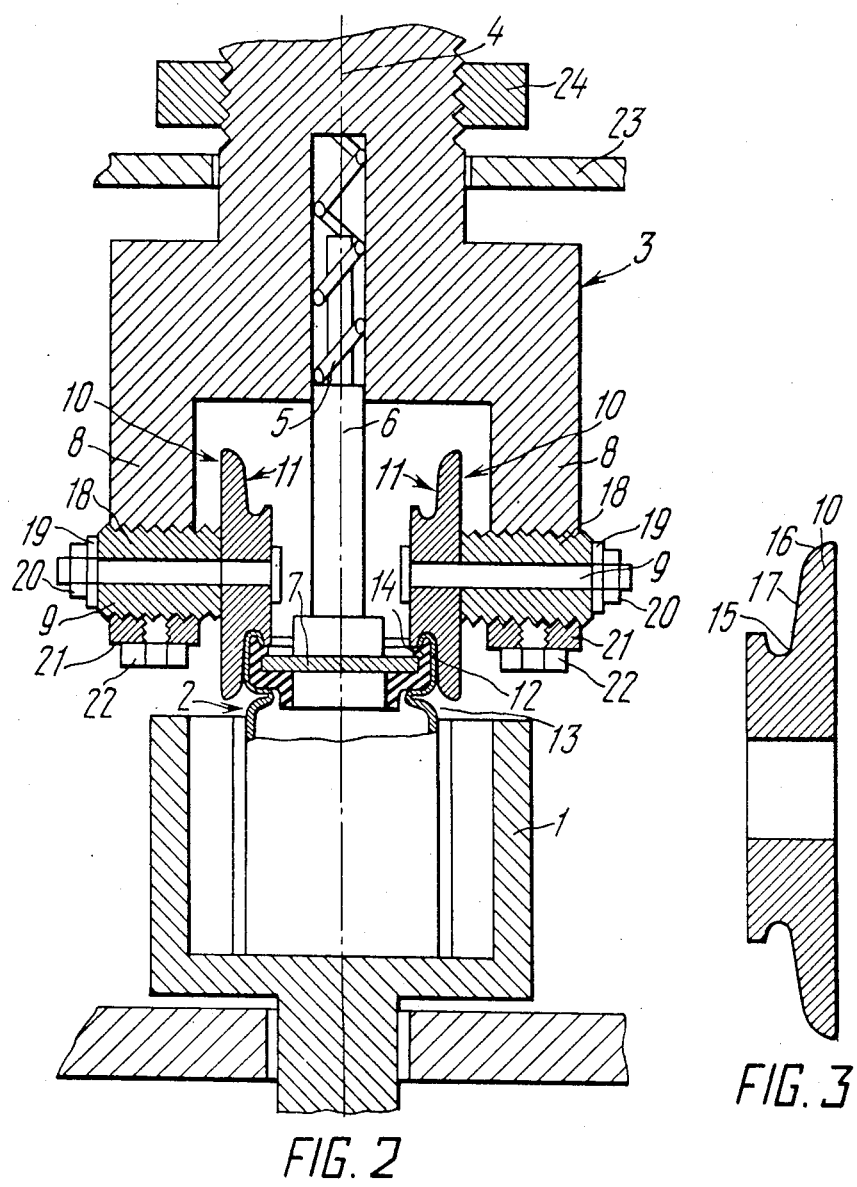
FIG. 2 is a longitudinal sectional view of the apparatus illustrated in FIG. 1 at the final stage of rolling-in the housing of the cylindrical storage cell.
FIG. 3 is a sectional view of a seaming roller according to the invention.

With the auxiliary holder 3 (FIG. 1) in its topmost position the main holder 1 is accessible for receiving the cylindrical storage cell 2 to be fitted thereinto and clamped therein. Thereafter, the holder 3 is fed toward the holder 1. The rod 6 is first brought into contact with the cover cap 7 of the storage cell to orient the cover cap 7 perpendicularly to the axis 4 and force it until the sealing gasket 14 is compressed at the portion 12 of the housing 13 of the storage cell 2. The holder 1 rotates the storage cell 2, and the toroidal section 16 (FIG. 3) of the working surface 11 (FIG. 1) of the seaming rollers 10 is brought into contact with the edge of the portion 12 of the housing 13 of the storage cell 2 being rolled-in to force this edge toward the axis 4 (FIG. 1). A further movement of the holder 3 causes the rollers 10 to exert a radial force on the portion 12 to thereby deform it and the sealing gasket 14 to a size determined by the distance between the straight sections 17 (FIG. 3) of the working surfaces 11 (FIG. 2) of the rollers 10. A still further movement of the holder 3 results in the edge of the portion 12 moving into abutment against the toroidal section 15 (FIG. 3) of the surface 11 (FIG. 2) of the rollers 10 toward the axis 4 providing axial compression of the sealing gasket 14 to the dimensions determined by the mutual positioning of the bearing nut 24 and lock washer 23. When the portion 12 is finally formed, the holder 3 with the rollers 10 travels upwards, rotation of the power cell 2 is terminated, and the holder 1 opens to release the storage cell 2.

According to one feature of the invention, in response to wear of the roller 10, the sleeves 18 are screwed radially inwardly more toward the axis 4 to thereby displace the rollers 10 so as to again ensure adequate rolling-in of the portion 12 of the housing 13 of the storage cell 2. For this purpose the screws 22 are slackened and tightened again when the sleeves 18 have a assumed new desired position.

The apparatus embodying the present invention makes it possible to completely seal a cylindrical storage cell within a single production operation to result in greater efficiency.

In addition, the invention allows simplified operation procedures associated with sealing cylindrical storage cells.

What is claimed is:

1. An apparatus for sealing a cylindrical storage cell having a cover cap and a housing with a portion thereof to be rolled-in comprising:

a first holder having a first and second end faces, a longitudinal axis, a passage extending along said longitudinal axis, and a wall, this holder being capable of travelling along said longitudinal axis;

a spring accommodated inside said passage of said first holder;

a rod for orienting said cover cap of said cylindrical storage cell perpendicularly to said longitudinal axis of said first holder, said rod having a longitudinal axis which coincides with said longitudinal axis of said first holder, said rod being secured inside said passage of said first holder to move along its longitudinal axis by means of said spring;

a second holder capable of rotation and accommodating said cylindrical storage cell;

a means for rolling-in said housing of said cylindrical storage cell and having;

first and second shafts having longitudinal axes and secured coaxially in said wall of said first holder;

first and second seaming rollers each having a working surface facing said portion of the housing to be subjected to the rolling-in operation, these rollers being mounted on said first and second shafts to rotate from said cylindrical housing as said working surfaces are brought into contact with said portion of the cylindrical housing to be subjected to rolling-in;

first and second elements for adjusting the distance between said seaming rollers mechanically connected to said first and second shafts and to said first and second seaming rollers;

first and second stop means for limiting the movement of said seaming rollers mechanically connected respectively to the first and second elements for adjusting the distance between said rollers.

2. An apparatus as defined in claim 1, in which each said working surface of said seaming rollers of said means for rolling-in said housing of the cylindrical storage cell is comprised of:

a first toroidal section;

a second toroidal section conforming in configuration to the shape of the portion of said housing of the cylindrical storage cell to be subjected to rolling-in operation; and a straight section connecting said first and second toroidal sections.

3. An apparatus as defined in claim 2, in which said first and second elements for adjusting the distance between said seaming rollers of said means for rolling-in said housing of the cylindrical storage cell are fashioned as first and second sleeves arranged, respectively, on said first and second shafts and screwed into said wall of said first holder to a contact with said first and second seaming rollers, respectively.

4. An apparatus as defined in claim 3, in which used as said first and second stop means for limiting the movement of said seaming rollers of said means for rolling-in said housing of the cylindrical storage cell are first and second screws set in said first and second ends of said first holder perpendicularly to said longitudinal axes of said first and second shafts to engage with said first and second sleeves.

* * * * *